(12) United States Patent
Shahmohammadi et al.

(10) Patent No.: US 10,928,631 B1
(45) Date of Patent: Feb. 23, 2021

(54) WAVEGUIDE DISPLAY WITH STRUCTURED LIGHT FOR EYE AND FACE TRACKING

(71) Applicant: Facebook Technologies, LLC, Menlo Park, CA (US)

(72) Inventors: Mohsen Shahmohammadi, Pittsburgh, PA (US); Behnam Bastani, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/293,558

(22) Filed: Mar. 5, 2019

(51) Int. Cl.
*G02B 6/35* (2006.01)
*H04N 5/33* (2006.01)
*G02B 27/00* (2006.01)
*F21V 8/00* (2006.01)
*G06K 9/00* (2006.01)
*G02B 27/01* (2006.01)

(52) U.S. Cl.
CPC ....... *G02B 27/0093* (2013.01); *G02B 6/0035* (2013.01); *G02B 6/0076* (2013.01); *G02B 27/0172* (2013.01); *G06K 9/00604* (2013.01); *H04N 5/33* (2013.01); *G02B 2027/0178* (2013.01)

(58) Field of Classification Search
CPC .............. G02B 27/0093; G02B 6/0035; G02B 6/0076; G02B 27/0172; G06K 9/00604; H04N 5/33
See application file for complete search history.

(56) References Cited

U.S. PATENT DOCUMENTS

| 9,494,799 | B2 * | 11/2016 | Robbins | .................... H04N 5/33 |
| 10,168,537 | B1 * | 1/2019 | Parsons | ................ G02B 26/101 |
| 10,585,477 | B1 * | 3/2020 | Cavin | ....................... G06T 7/70 |
| 2019/0086674 | A1 * | 3/2019 | Sinay | ................. G02B 27/0093 |

* cited by examiner

*Primary Examiner* — Tsion B Owens
(74) *Attorney, Agent, or Firm* — Fenwick & West LLP (57) ABSTRACT

A near-eye-display (NED) includes a tracking system and a waveguide assembly. The waveguide assembly includes an infrared (IR) light source and an output waveguide. The output waveguide includes at least a decoupling element that outcouples the IR light emitted by the IR light source to form the structured light pattern. The structured light pattern is projected toward one or more regions of a user's face, for example, the user's eyes. The structured light pattern is reflected off the one or more regions of the user's face and captured by the tracking system. The tracking system can determine tracking information such as eye tracking information as well as face tracking information based on the captured reflected structured light pattern.

13 Claims, 7 Drawing Sheets

WAVEGUIDE DISPLAY WITH STRUCTURED LIGHT FOR EYE AND FACE TRACKING

BACKGROUND

The present disclosure generally relates to waveguide displays, and specifically to spatially switching the image light exiting from the waveguide display according to eye movements.

Near-eye light field displays project images directly into a user's eye, encompassing both near-eye displays (NEDs) and electronic viewfinders. Conventional near-eye displays (NEDs) generally have a display element that generates image light that passes through one or more lenses prior to reaching the user's eyes. Additionally, NEDs in augmented reality systems are typically required to be compact and light weight, and to provide large exit pupil with a wide field-of-vision for ease of use. However, designing a conventional NED with scanners providing high brightness and uniform illumination intensity can result in a low out-coupling efficiency of the image light received by the user's eyes.

SUMMARY

A near-eye display (NED) includes a tracking system and a waveguide display. The tracking system tracks movement of a user's eyes and/or a user's facial expression. Media content can be adjusted based on the movement of the user's eyes and/or the user's facial expression. The waveguide display includes an image light source, an infrared (IR) light source, an output waveguide and a controller. The output waveguide receives IR light emitted from the IR light source and output couples the IR light to form a structured light pattern to illuminate a target area. The target area includes an eyebox location and/or one or more regions of a user's face. The output waveguide includes at least a grating that outcouples the IR light to form the structured light pattern. Movements of the user's eyes and/or face in the one or more regions are tracked by the tracking system. In some configurations, the controller determines an eyebox location based on the tracked location of the eye from the eye tracking system.

The output waveguide may include a coupling element (e.g., a grating) that receives an image light from the source assembly, and one or more decoupling elements (e.g., gratings) that outcouple the image light to one or more eyebox locations. The image light may be expanded after being incoupled by the coupling element. In some configurations, the output waveguide includes one or more optical waveguide elements. An optical waveguide element confine light of an optical band within the optical waveguide element. In some configurations, the output waveguide includes one optical waveguide element that confines visible and IR light within the optical waveguide element. In some configurations, the output waveguide includes two optical waveguide elements one of which confines red and IR light and the other one of which confines green and blue light. In some configurations, the output waveguide includes three optical waveguide elements one of which confines IR light, the second one of which confines red light, and the last one of which confines green and blue light. The optical waveguide elements may be stacked.

In some configurations, the output waveguide includes two decoupling elements one of which outcouples IR light and the other one of which outcouples visible light. In some configurations, the output waveguide includes two decoupling elements one of which outcouples IR and red light and the other one of which outcouples green and blue light. In some configurations, the output waveguide includes three decoupling elements one of which outcouples IR light, the second one of which outcouples red light, and the last one of which outcouples green and blue light. The decoupling elements may be positioned in separate optical waveguide elements or stacked in one optical waveguide element.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A headset includes a tracking system and a waveguide display. The tracking system tracks and moves eyebox locations based on a movement of the user's eyes. The tracking system tracks the user's facial expression and adapts media content presented to the user. The waveguide display includes a source assembly, an infrared (IR) light source, an output waveguide assembly, and a controller. The output waveguide includes at least a decoupling element that outcouples the IR light emitted by the IR light source to form the structured light pattern. The structured light pattern is projected toward a target area. The target area includes one or more regions of a user's face, for example, the user's eyes. The structured light pattern is reflected off the one or more regions of the user's face and captured by the tracking system. The tracking system can determine eye tracking information as well as face tracking information based on the captured reflected structured light pattern.

The output waveguide may include a coupling element that receives an image light from the source assembly, and one or more decoupling elements that outcouple the image light to one or more eyebox locations. The image light may be expanded (e.g., pupil replication) after being incoupled by the coupling element. In some configurations, the output waveguide includes one or more optical waveguide elements. An optical waveguide element confines light of an optical band within the optical waveguide element. In some configurations, the output waveguide includes one optical waveguide element that confines visible and IR light within the optical waveguide element. In some configurations, the output waveguide includes two optical waveguide elements one of which confines red and IR light and the other one of which confines green and blue light. In some configurations, the output waveguide includes three optical waveguide elements one of which confines IR light, the second one of which confines red light, and the last one of which confines green and blue light. The optical waveguide elements may be stacked.

In some configurations, the output waveguide includes two decoupling elements one of which outcouples IR light and the other one of which outcouples visible light. In some configurations, the output waveguide includes two decoupling elements one of which outcouples IR and red light and the other one of which outcouples green and blue light. In some configurations, the output waveguide includes three decoupling elements one of which outcouples IR light, the second one of which outcouples red light, and the last one of which outcouples green and blue light. The decoupling elements may be positioned in separate optical waveguide elements or stacked in one optical waveguide element.

Figure 1:
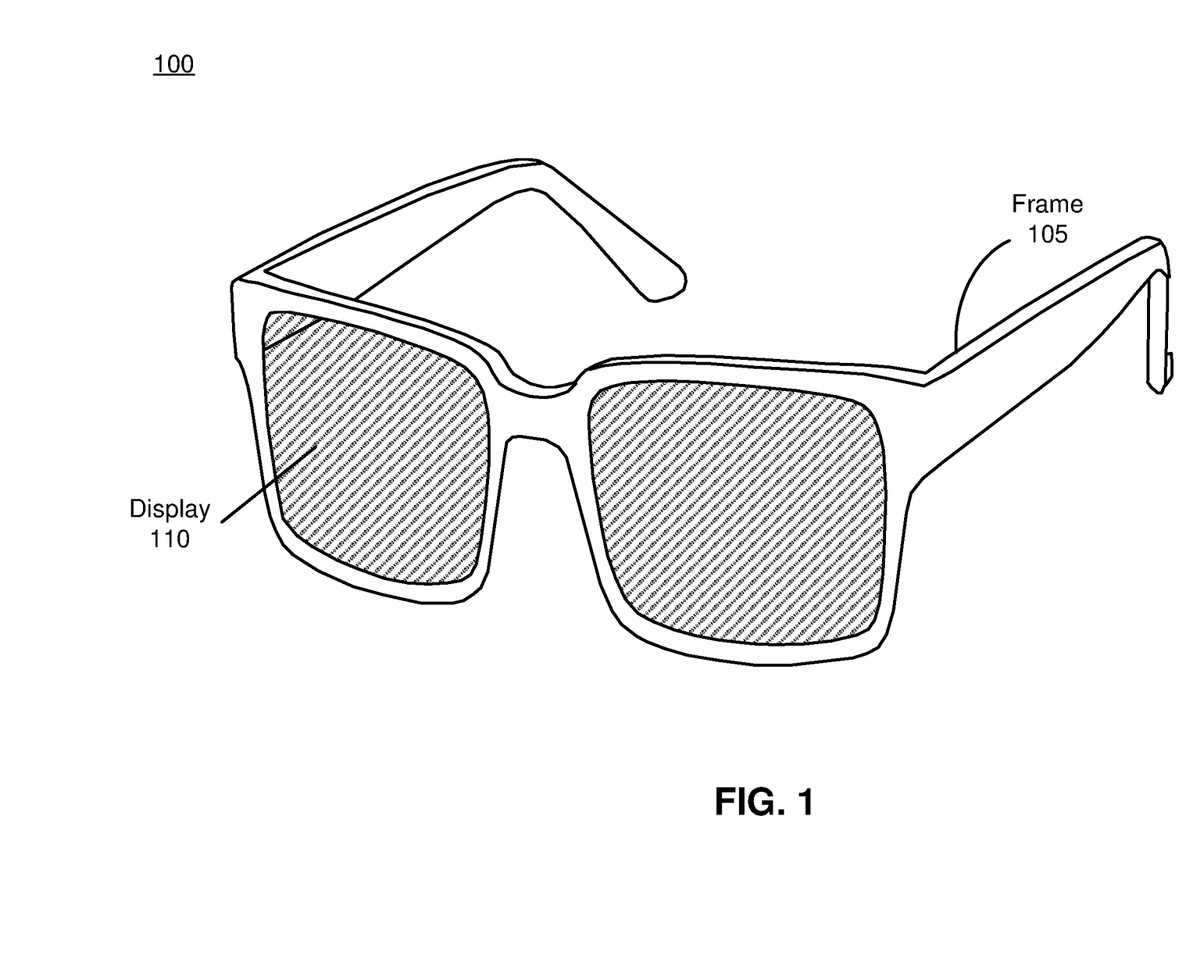
FIG. 1 is a diagram of a headset, in accordance with one or more embodiments.

FIG. 1 is a diagram of a headset 100, in accordance with one or more embodiments. In FIG. 1, the headset is illustrated as a near-eye display (NED). The headset 100 presents media to a user. Examples of media presented by the headset 100 include one or more images, video, audio, or some combination thereof. In some embodiments, audio is presented via an external device (e.g., speakers and/or headphones) that receives audio information from the headset 100, a console (not shown), or both, and presents audio data based on the audio information. The headset 100 is generally configured to operate as a virtual reality (VR) headset. However, in some embodiments, the headset 100 may be modified to also operate as an augmented reality (AR) headset, a mixed reality (MR) headset, or some combination thereof. For example, in some embodiments, the headset 100 may augment views of a physical, real-world environment with computer-generated elements (e.g., images, video, sound, etc.).

The headset 100 shown in FIG. 1 includes a frame 105 and a display 110. The frame 105 includes one or more optical elements which together display media to users. The display 110 is configured for users to see the content presented by the headset 100. As discussed below in conjunction with FIG. 2, the display 110 includes at least one source assembly to generate image light to present media to an eye of the user. The source assembly includes, e.g., a source, an optics system, or some combination thereof. The waveguide display assembly includes, e.g., a waveguide display, a stacked waveguide display, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., each waveguide in the array is a source of a different color. A varifocal waveguide display is a display that can adjust a focal position of image light emitted from the waveguide display. Some examples of waveguide displays are described in detail in U.S. patent application Ser. No. 15/495,373, incorporated herein by references in its entirety. Other types of displays may be used. For example, the optical elements 110 may include curved combiners with scanners, or holographic combiners.

Figure 2:
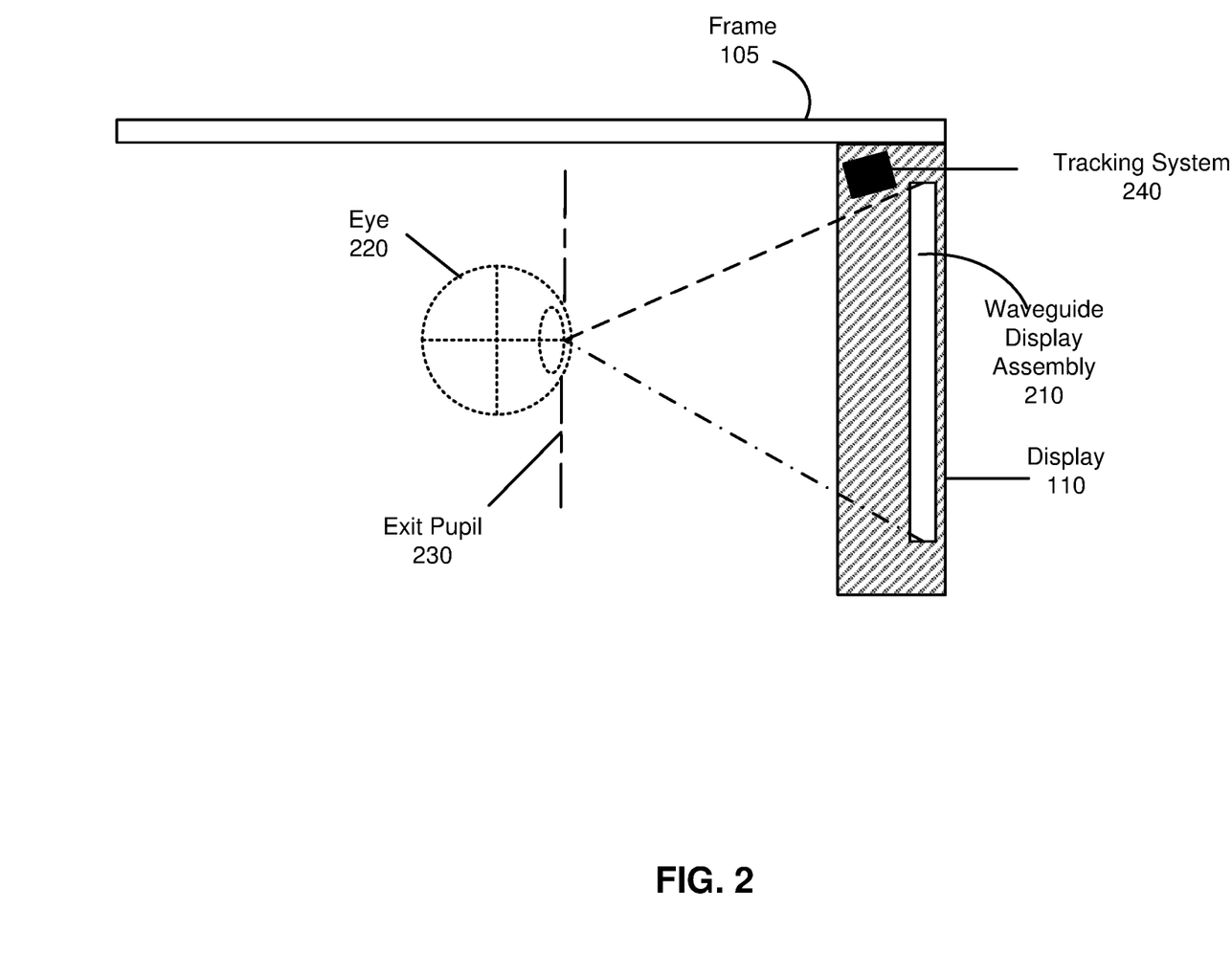
FIG. 2 is a cross-sectional view of the headset illustrated in FIG. 1, in accordance with one or more embodiments.

FIG. 2 is a cross-sectional view 200 of the headset 100 illustrated in FIG. 1, in accordance with one or more embodiments. The headset 100 includes at least one waveguide display assembly 210, and a tracking system 240. In some embodiments, the frame 105 may represent a frame of eye-wear glasses. For purposes of illustration, FIG. 2 shows the cross-sectional view associated with a single eye 220 and a single waveguide display assembly 210, but in alternative embodiments not shown, another waveguide assembly which is separate from the waveguide display assembly 210 shown in FIG. 2, provides image light to another eye 220 of the user.

The waveguide display assembly 210, as illustrated below in FIG. 2, is configured to direct image light to at least a portion of a target area 230 that includes an eyebox. The image light can be generated by the at least one source assembly included in the display 100 as described above. In some embodiments, the source assembly is a part of a waveguide display assembly 210. The target area includes an eyebox (e.g., a location where an eye of a user is positioned while wearing the headset 100), and may also include a portion of a face surrounding an eye in the eyebox (e.g., brow, cheek, nose, etc.). The waveguide display assembly 210 may be composed of one or more materials (e.g., plastic, glass, etc.) with one or more refractive indices that effectively minimize the weight and widen a field of view (hereinafter abbreviated as 'FOV') of the headset 100. In alternate configurations, the headset 100 includes one or more optical elements between the waveguide display assembly 210 and the eye 220. The optical elements may act to, e.g., correct aberrations in image light emitted from the waveguide display assembly 210, magnify image light emitted from the waveguide display assembly 210, adjust a focal length of image light emitted from the waveguide display assembly 210, some other optical adjustment of image light emitted from the waveguide display assembly 210, or some combination thereof. The example for optical elements may include an aperture, a varifocal lens, a Fresnel lens, a convex lens, a concave lens, a filter, or any other suitable optical element that affects image light.

In some embodiments, the waveguide display assembly 210 may include a source assembly to generate an image light to present media to user's eyes. The source assembly includes, e.g., a source, an optics system, or some combination thereof.

The tracking system 240 tracks a position and movement of a user's eye at one or more eyebox locations of the headset 100. The tracking system 240 also tracks the user's facial expression in a region of the user's face surrounding the user's eye. In one example, the eyebox location includes a length of 20 mm and a width of 10 mm. A camera or other optical sensor inside the headset 100 controlled by the tracking system 240 captures images of one or both eyes of the user, and the tracking system 240 uses the captured images to determine tracking information such as eye tracking information as well as facial tracking information.

Eye tracking information includes information associated with a position and/or movement of a user's eye at one or more eyebox locations. For example, the eye tracking information includes an inter-pupillary distance, an interocular distance, a three-dimensional (3D) position of each eye relative to the headset 100 for distortion adjustment purposes, including a magnitude of torsion and rotation, and gaze directions for each eye. The tracking system 240 tracks different types of eye movements including, but not restricted to, a saccadic eye movement (e.g. rapid and conjugate movements), a pursuit movement (e.g. a slow-tracking), a compensatory eye movement (e.g. smooth movements compensating for active or passion motions), a vergence eye movement (e.g. two eye moving in opposite directions), a miniature eye movement (e.g. a steady and fixed view of a target), an optokinetic nystagmus (e.g. a sawtooth pattern), or some combination thereof.

Face tracking information includes information associated with one or more motions and/or positions of muscles in the region of the user's face that surrounds the user's eye. For example, the face tracking information includes a position of a brow, a degree of eye opening, a length of a wrinkle, a 3D position of a brow relative to the headset 100 for distortion adjustment purposes, including a magnitude of torsion and rotation. The tracking system 240 tracks different types of facial motion including, but not restricted to, inner brow raising and/or lowering, inner brow shifting, outer brow raising and/or lowering, outer brow shifting, lid raising and/or lowering, cheek raising and/or lowering, nose wrinkling, and the like.

Figure 3:
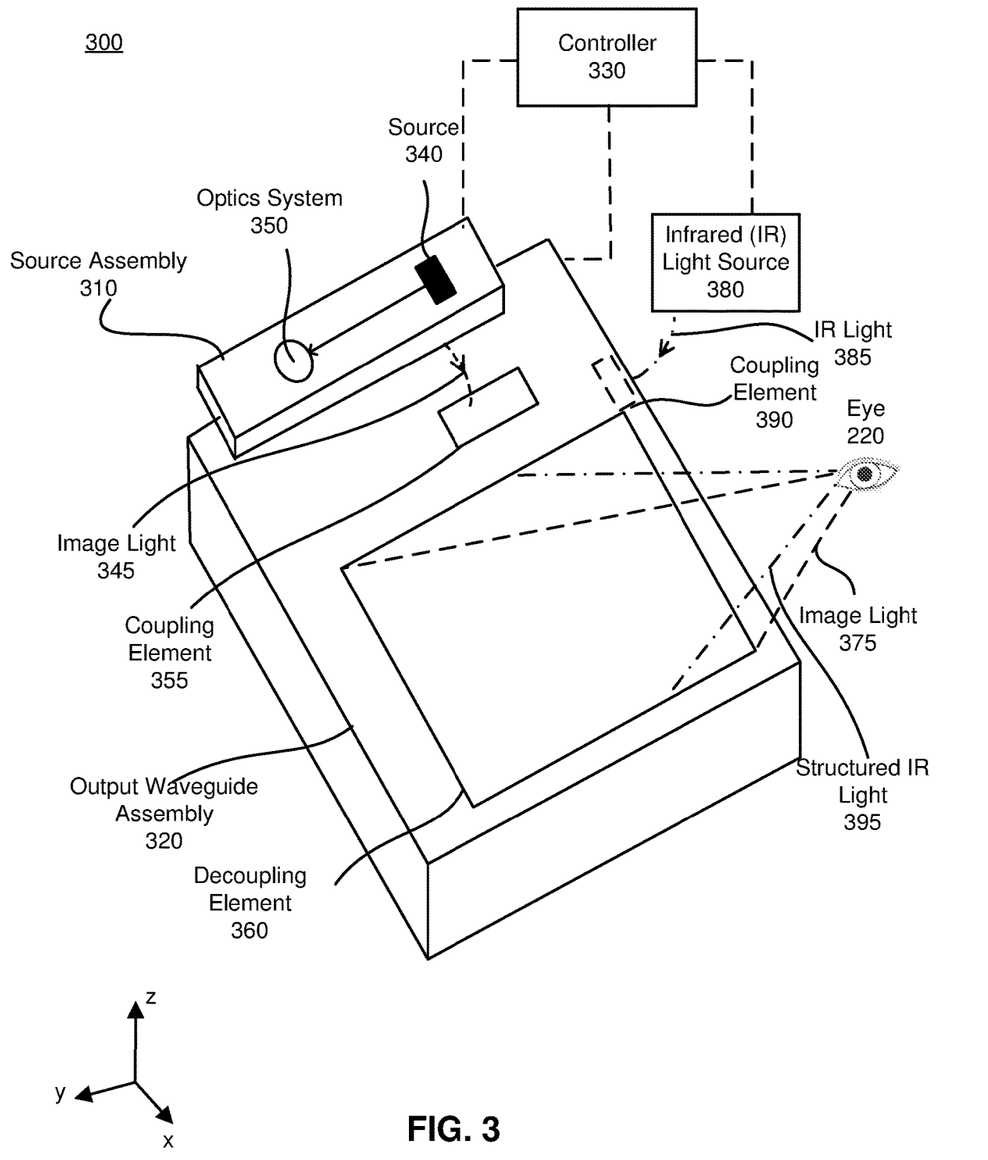
FIG. 3 illustrates an isometric view of a waveguide display, in accordance with one or more embodiments.

FIG. 3 illustrates an isometric view of a waveguide display 300, in accordance with one or more embodiments. In some embodiments, the waveguide display 300 is a component (e.g., waveguide display assembly 210) of the headset 100. In alternate embodiments, the waveguide display 300 is part of some other headset, or other system that directs display image light to a particular location.

The waveguide display 300 includes at least a source assembly 310, an infrared (IR) light source 380, an output waveguide assembly 320, and a controller 330. For purposes of illustration, FIG. 3 shows the waveguide display 300 associated with a single eye 220, but in some embodiments, another waveguide assembly separate (or partially separate) from the waveguide display 300, provides image light to another eye of the user. In a partially separate system, one or more components may be shared between waveguide assemblies for each eye.

The source assembly 310 generates image light. The source assembly 310 includes a source 340 and an optics system 350. The source 340 is an optical source that generates an image light, as described in detail below with regard to FIGS. 4A-4C. The optics system 350 is a set of optical components (e.g. lens, mirrors, etc.) that direct the image light received from the source 340. The source assembly 310 generates and outputs an image light 345 to a coupling element 355 of the output waveguide assembly 320.

The infrared (IR) light source 380 generates IR light. The IR light source 380 is an optical source that generates an IR light, as described in detail below with respect to FIGS. 4A-4C. The IR light source 380 may further include an optics system (not shown) that is a set of optical components (e.g. lens, mirrors, etc.) that direct the image light received from the optical source that emits the IR light. The IR light source 380 generates and outputs an IR light 385 to a coupling element 390 of the output waveguide assembly 320.

The output waveguide assembly 320 includes one or more optical waveguide elements that output image light and structured IR light. The output waveguide assembly 320 outputs the image light to one or more eyebox locations associated with the eye 220 of a user. The output waveguide assembly 320 outputs the structured IR light to a target area. The target area is an area that is occupied at least by the user's eye. The target area may be further occupied by a portion of the user's face. The target area includes at least the one or more eyebox locations associated with the eye 220 of a user.

The output waveguide assembly 320 receives the image light 345 at one or more coupling elements 355, and guides the received input image light to one or more decoupling elements 360. In some embodiments, the coupling element 355 couples the image light 345 from the source assembly 310 into the output waveguide assembly 320. The coupling element 355 may be, e.g., a diffraction grating, a holographic grating, some other element that couples the image light 345 into the output waveguide assembly 320, or some combination thereof. For example, in embodiments where the coupling element 355 is diffraction grating, the pitch of the diffraction grating is chosen such that total internal reflection occurs, and the image light 345 propagates internally toward the decoupling element 360. For example, the pitch of the diffraction grating may be in the range of 300 nm to 600 nm.

The output waveguide assembly 320 receives the IR light 385 at one or more coupling elements 390, and guides the received input IR light to one or more decoupling elements 360. In some embodiments, the coupling element 390 couples the IR light 385 from the IR light source 380 into the output waveguide assembly 320. The coupling element 390 may be, e.g., a diffraction grating, a holographic grating, some other element that couples the IR light 385 into the output waveguide assembly 320, or some combination thereof. For example, in embodiments where the coupling element 390 is diffraction grating, the pitch of the diffraction grating is chosen such that total internal reflection occurs, and the IR light 385 propagates internally toward the decoupling element 360. For example, the pitch of the diffraction grating may be in the range of 700 nm to 850 nm.

The decoupling element 360 decouples the total internally reflected image light and IR light from the output waveguide assembly 320. In various embodiments, the decoupling element 360 encodes the incoupled IR light to a structured IR light 395. The structured IR light 395 includes a structured pattern such as a symmetric or quasi-random dot pattern, grid, horizontal bars, or any combination thereof. The structured IR light 395 is reflected by the user's eye or face before being captured by the tracking system 240. The eye information and/or facial information can be determined from images of deformed structured elements captured by the tracking system 240.

The decoupling element 360 may include one or more gratings such as a diffraction grating, or a holographic grating, one or more cascaded reflectors, one or more prismatic surface elements, an array of holographic reflectors, or any combination thereof. In some embodiments, multiple gratings are part of an optical waveguide and positioned such that one grating is stacked on top of another grating. In some embodiments, the multiple gratings are each part of a corresponding optical waveguide used for causing total internal reflection of light of a particular optical band. In one embodiment, the decoupling element 360 includes a holographic grating that encodes the IR light 385 to form a structured light pattern.

The controller 330 controls the operations of the source assembly 310. The controller 330 determines instructions for the source assembly 310 based at least on the one or more display instructions. Display instructions are instructions to render one or more images. In some embodiments, display instructions may simply be an image file (e.g., bitmap). The display instructions may be received from, e.g., a console of a system (e.g., as described below in conjunction with FIG. 5). The instructions used by the source assembly 310 to generate the image light 345. The instructions may include, e.g., a type of a source of image light (e.g. monochromatic, polychromatic), an identifier for a particular source assembly, a scanning rate, an orientation of the source, one or more illumination parameters (described below with reference to FIGS. 4A-4C), or some combination thereof.

The controller 330 takes content for display, and divides the content into discrete sections. The controller 330 instructs the source 340 to sequentially present the discrete sections using individual source elements corresponding to a respective row in an image ultimately displayed to the user. The controller 330 instructs the optics system 350 to scan the presented discrete sections to different areas of the coupling element 355 of the output waveguide assembly 320. Accordingly, at the exit pupil of the output waveguide assembly 320, each discrete portion is presented in a different location. While each discrete section is presented at different times, the presentation and scanning of the discrete sections occurs fast enough such that a user's eye integrates the different sections into a single image or series of images.

Figure 4A:
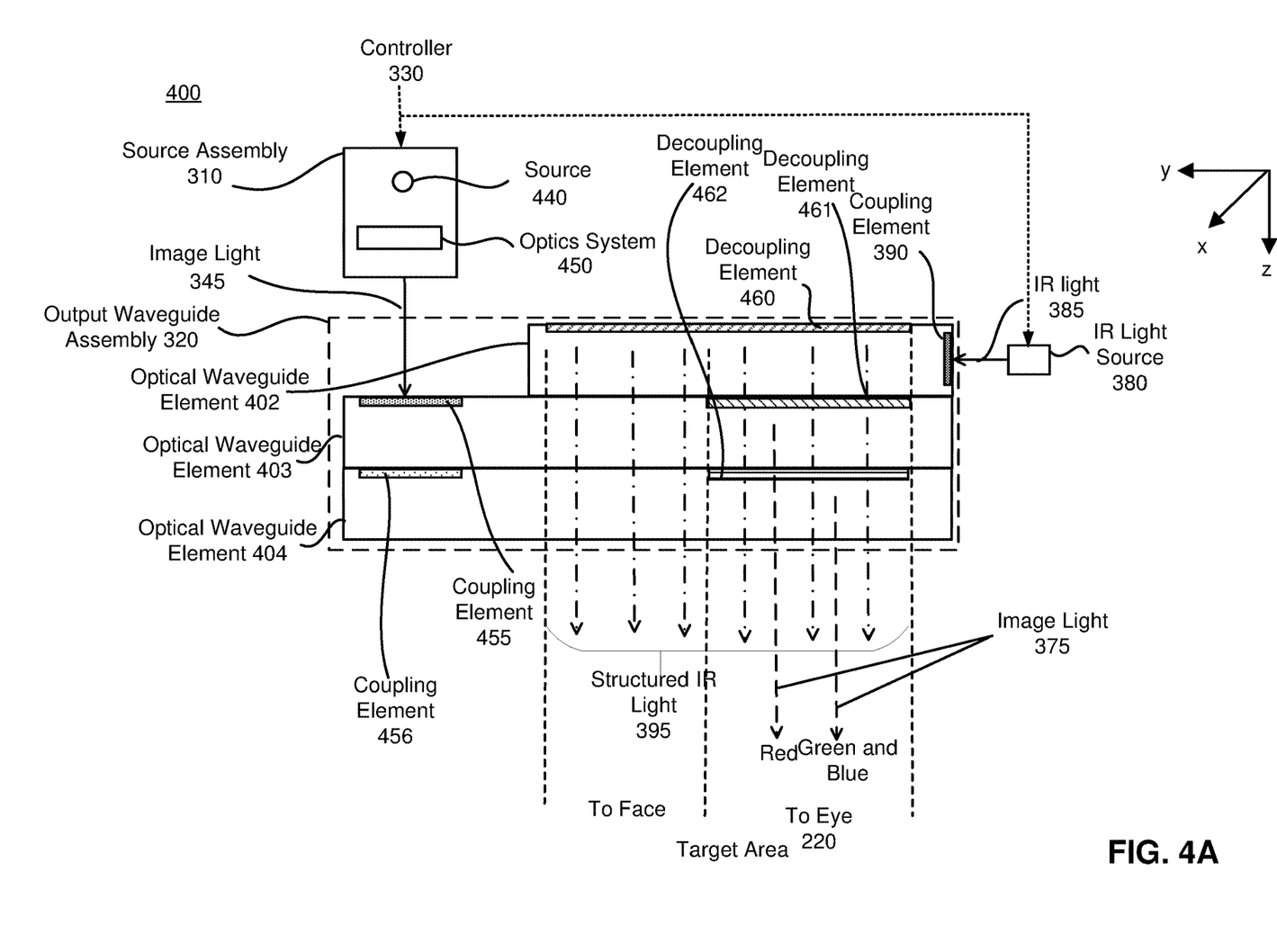
FIG. 4A illustrates a cross section of a waveguide display, in accordance with one or more embodiments.

FIG. 4A illustrates a cross section 400 of a waveguide display, in accordance with one or more embodiments. One example waveguide display with the illustrated cross section 400 is shown in FIG. 3. As described previously, the waveguide display 300 includes the source assembly 310 and the output waveguide assembly 320. The source assembly 310 includes a source 440 and an optics system 450. The source 440 is an embodiment of the source 340 of FIG. 3. The optics system 450 is an embodiment of the optics system 350 of FIG. 3. The output waveguide assembly 320 includes optical waveguide elements 402, 403, 404, coupling elements 455-456, the coupling element 390, and decoupling elements 460, 461, 462. The coupling elements 455-456 are an embodiment of the coupling element 390 of FIG. 3. The decoupling elements 460, 461, 462 are an embodiment of the decoupling element 360 of FIG. 3.

The source assembly 310 generates light in accordance with instructions from the controller 330. The source assembly 310 includes a source 440 and an optics system 450. The source 440 is a source of light that generates a spatially coherent or a partially spatially coherent image light. The source 440 may be, e.g., a superluminous LED, a laser diode, a vertical cavity surface emitting laser (VCSEL), a light emitting diode, a tunable laser, or some other light source that emits coherent or partially coherent light. The source 440 emits light in a visible band (e.g., from about 390 nm to 700 nm), and it may emit light that is continuous or pulsed. In some embodiments, the source 440 may be a superluminous LED (SLED) array of densely packed ridge waveguides with a wide emission spectrum. The source 440 emits light in accordance with one or more illumination parameters received from the controller 330. An illumination parameter is an instruction used by the source 440 to generate light. An illumination parameter may include, e.g., source wavelength, pulse rate, pulse amplitude, beam type (continuous or pulsed), other parameter(s) that affect the emitted light, or some combination thereof.

The optics system 450 includes one or more optical components that condition the light from the source 440. Conditioning light from the source 440 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 310) is the image light 345. The optics system 450 outputs the image light 345 at a particular orientation (in accordance with the instructions) toward the output waveguide assembly 320.

The IR light source 380 is a source of light that generates a spatially coherent or a partially spatially coherent IR light. The source 440 may be, e.g., an IR LED, a laser diode, a vertical cavity surface emitting laser (VCSEL), a tunable laser, or some other light source that emits coherent or partially coherent light. The IR light source 380 emits light in an IR band (e.g., from about 700 nm to 1 mm), and it may emit light that is continuous or pulsed. The IR light source 380 may emit light in accordance with one or more illumination parameters received from the controller 330. An illumination parameter is an instruction used by the source 440 to generate light. An illumination parameter may include, e.g., source wavelength, pulse rate, pulse amplitude, beam type (continuous or pulsed), other parameter(s) that affect the emitted light, or some combination thereof. The IR light source 380 may also include optical components that condition the IR light emitted from the IR light source 380 such as expanding, collimating, adjusting orientation in accordance with instructions from the controller 330. The one or more optical components may include, e.g., lenses, mirrors, apertures, gratings, or some combination thereof. The IR light source 380 outputs the IR light 385 at a particular orientation toward the output waveguide assembly 320.

The output waveguide assembly 320 includes optical waveguide elements 402, 403, 404. Each of the optical waveguide elements 402, 403, 404 is a structure that confines light of an optical band internally within the optical waveguide element. The optical waveguide elements 402, 403, 404 confine light of discrete optical bands. In the illustrated example, the optical waveguide element 402 confines light that is in the IR band, the optical waveguide element 402 confines red visible light that is in the optical band of about 635-700 nm, and the optical waveguide element 404 confines green and blue light that is in the optical band of about 450-520 nm.

The coupling elements 455-456 are an embodiment of the coupling element 355. The coupling elements 455, 456 incouple the image light 345 into the output waveguide assembly 320. The coupling elements 455-456 can incouple image light of different color channels (e.g., red, green, blue) into the output waveguide assembly 320. A color channel corresponds to an optical band. For example, the coupling element 455 incouples light of a first color channel (e.g., red) of the image light 345 into the optical waveguide element 403 and the coupling element 455 incouples light of a different color channel (e.g., green, blue) of the image light 345 into the optical waveguide element 404. In the illustrated example, the green and blue light of the image light 345 passes through the coupling element 455 and the optical waveguide element 403 prior to being incoupled into the optical waveguide element 404 by the coupling element 456. The coupling element 455 is affixed to or part of a proximate side of the optical waveguide element 403 that is closest to the source assembly 310 among all sides of the optical waveguide element 403. The coupling element 456 is affixed to or part of a proximate side of the optical waveguide element 404 that is closest to the source assembly 310 among all sides of the optical waveguide element 404.

In the illustrated example, the coupling elements 455, 456 have substantially the same cross-sectional area along the x-y plane. The coupling elements 455, 456 are positioned such that they are aligned with each other. In some embodiments, the coupling elements 455, 456 may have different cross-sectional area. There may be an offset between the coupling elements 455-456. In some embodiments, the coupling elements 455, 456 do not overlap with each other. The coupling elements 455, 456 may be positioned on other locations of the optical waveguide elements 403, 404, respectively.

In the illustrated example, the coupling elements 455-456 are separated by a distance along the Z-axis. In other configurations, the coupling elements 455-456 are both embedded into the optical waveguide element 403.

The decoupling elements 460, 461, 462 are an embodiment of the decoupling element 360 of FIG. 3. Each of the decoupling elements 460, 461, 462 outcouples the total internally reflected light of a corresponding optical band from the output waveguide assembly 320. For example, the decoupling element 460 outcouples the total internally reflected IR light from the optical waveguide element 402, the decoupling element 461 outcouples the totally internally reflected red light from the optical waveguide element 403, and the decoupling element 462 outcouples the totally internally reflected green and blue light from the optical waveguide element 404. In the illustrated example, the IR light passes through the decoupling element 461, the optical waveguide element 403, the decoupling element 462, and the optical waveguide element 404 before exiting the output waveguide assembly 320. The red light passes through the decoupling element 462 and the optical waveguide element 404 before exiting the output waveguide assembly 320. The red, blue, and green light that exit the output waveguide assembly 320 create the image light 375. An orientation and position of the image light 375 exiting from the output waveguide assembly 320 is controlled by changing an orientation and position of the image light 345 entering the output waveguide assembly 320.

The decoupling element 460 encodes the IR light to form a structured light pattern. That is, the IR light exiting from the output waveguide assembly 320 is a structured IR light 395. The structured IR light 395 is patterned (e.g., a grid, a series of lines, a pattern of symmetrical or quasi-randomly oriented dots). In some embodiments, the decoupling element 460 is a holographic grating that diffracts the IR light to form the structured pattern.

The decoupling element 460 has a larger cross-sectional area along the x-y plane than the decoupling elements 461 and 460. The x-y plane is parallel to a surface of the output waveguide assembly 320. This is because a portion of the structured IR light that is outcoupled by the decoupling element 460 is projected toward the user's face that is outside the eyebox location. In other embodiments, the decoupling elements 460, 461, 462 may have substantially the same cross-sectional area along the x-y plane. The decoupling elements 460, 461, 462 may be positioned on other locations of the optical waveguide elements 402, 403, 404, respectively.

In the illustrated example, the decoupling elements 461, 462 have substantially the same cross-sectional area along the x-y plane. The decoupling elements 461-462 are positioned such that they are aligned with each other. In some embodiments, the decoupling elements 461-462 may have different cross-sectional area. There may be an offset between the decoupling elements 461-462. In some embodiments, the decoupling elements 461-462 do not overlap with each other.

In the illustrated example, the decoupling elements 460, 461, 462 are separated by distances along the Z-axis. In other configurations, two or all of the decoupling elements 460, 461, 462 can be embedded into one of the optical waveguide elements 402, 403, 404.

In the illustrated example, each of the coupling elements 455, 456 couples the image light 345 into the output waveguide assembly 320 and the image light propagate along the y-axis. The coupling element 390 couples the IR light 385 into the output waveguide assembly 320 and the IR light propagates along the y-axis. Each of the decoupling elements 460, 461, 462 diffracts the image light or IR light to propagate along the z-axis toward the eyebox or the target area. Note that the received image light or the IR light may be expanded in 2D until this state. In the illustrated example, the image light 375 is surrounded by the structured IR light 395 on the left side. In other embodiments, the image light 375 is surrounded by the structured IR light 395 on the right side or both sides.

Figure 4B:
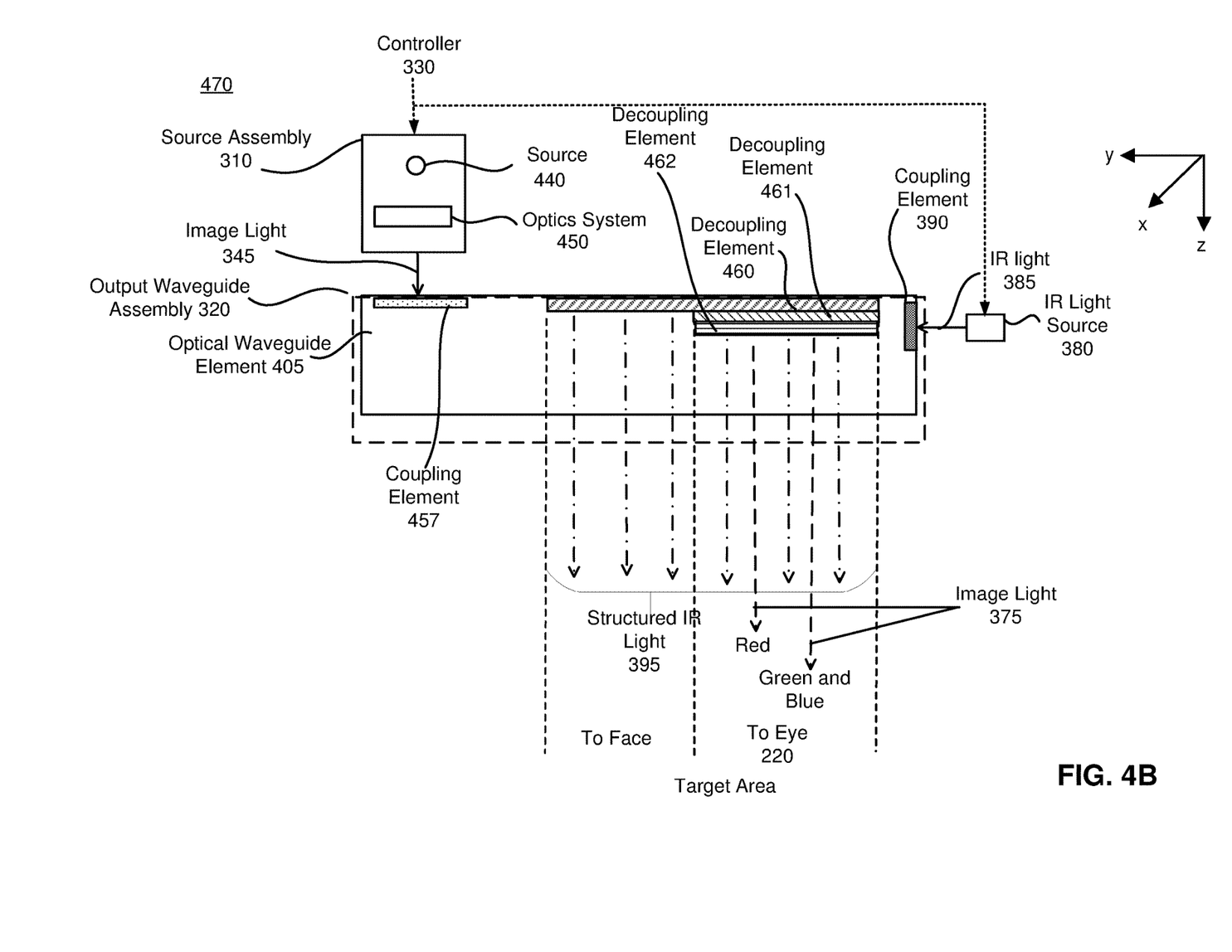
FIG. 4B illustrates a cross section of a waveguide display, in accordance with one or more embodiments.

FIG. 4B illustrates a cross section 470 of a waveguide display, in accordance with one or more embodiments. One example waveguide display with the illustrated cross section 400 is shown in FIG. 3. As described previously, the waveguide display 300 includes the source assembly 310 and the output waveguide assembly 320. The source assembly 310 includes a source 440 and an optics system 450. The source 440 is an embodiment of the source 340 of FIG. 3. The optics system 450 is an embodiment of the optics system 350 of FIG. 3. The output waveguide assembly 320 includes an optical waveguide element 405, a coupling element 457, and decoupling elements 460, 461, 462. The decoupling elements 460, 461, 462 are an embodiment of the decoupling element 360 of FIG. 3.

Description of the source assembly 310 including the source 440 and the optics system 450 as well as the IR light source 380 has been provided previously in connection with FIGS. 3-4A and is omitted herein for the sake of brevity.

The output waveguide assembly 320 includes an optical waveguide element 405 that is a structure that confines visible light as well as IR light internally within the optical waveguide element 405.

The coupling element 457 is an embodiment of the coupling element 355. The coupling element 457 incouples the image light 345 into the optical waveguide element 405. The coupling element 457 is affixed to or part of a proximate side of the optical waveguide element 405 that is closest to the source assembly 310 among all sides of the optical waveguide element 405. The coupling element 457 may be positioned on other locations of the optical waveguide element 405.

The decoupling elements 460, 461, 462 are an embodiment of the decoupling element 360 of FIG. 3. Each of the decoupling elements 460, 461, 462 outcouples the total internally reflected light of an optical band from the output waveguide assembly 320. For example, the decoupling element 460 outcouples the total internally reflected IR light from the optical waveguide element 405, the decoupling element 461 outcouples the totally internally reflected red light from the optical waveguide element 405, and the decoupling element 462 outcouples the totally internally reflected green and blue light from the optical waveguide element 405.

The decoupling element 460 encodes the IR light to form a structured light pattern. That is, the IR light exiting from the output waveguide assembly 320 is a structured IR light 395. The structured IR light 395 is of a pattern (e.g., a grid, a series of lines, a pattern of symmetrical or quasi-randomly oriented dots). In some embodiments, the decoupling element 460 includes a holographic grating that diffracts the IR light to form the structured pattern.

In the illustrated example, the decoupling elements 460, 461, 462 are stacked. The structured IR light 395 passes through the decoupling elements 461-462 prior to exiting the output waveguide assembly 320 and reaching the target area. The red light passes through the decoupling element 462 prior to exiting the output waveguide assembly 320 and reaching the target area. The red, blue, and green light that exit the output waveguide assembly 320 create the image light 375. An orientation and position of the image light 375 exiting from the output waveguide assembly 320 is controlled by changing an orientation and position of the image light 345 entering the output waveguide assembly 320. In other configurations, instead of using the decoupling elements 461-462, one decoupling element is used to outcouple the totally internally reflected image light. In other configurations, instead of using the decoupling elements 460-461, one decoupling element is used to outcouple totally internally reflected IR light and red light.

The decoupling element 460 has a larger cross-sectional area along the x-y plane than the decoupling elements 461 and 460. This is because a portion of the structured IR light that is outcoupled by the decoupling element 460 is projected toward the user's face that is outside the eyebox location. In other embodiments, the decoupling elements 460, 461, 462 may have substantially the same cross-sectional area along the x-y plane. The decoupling elements 460, 461, 462 may be positioned on other locations of the optical waveguide element 405.

In the illustrated example, the decoupling elements 461-462 have substantially the same cross-sectional area along the x-y plane. The decoupling elements 461-462 are positioned such that they are aligned with each other. In some embodiments, the decoupling elements 461-462 may have different cross-sectional area. There may be an offset between the decoupling elements 461-462. In some embodiments, the decoupling elements 461-462 are positioned such that they do not overlap with each other. That is, both the decoupling elements 461-462 are stacked on the decoupling element 460.

In the illustrated example, the coupling element 457 couples the image light 345 into the optical waveguide element 405 and the image light propagate along the y-axis. The coupling element 390 couples the IR light 385 into the output waveguide assembly 320 and the IR light propagates along the y-axis. Each of the decoupling elements 460, 461, 462 diffracts the image light or IR light to propagate along the z-axis toward the eyebox or the target area. Note that the received image light or the IR light may be expanded in 2D until this state. In the illustrated example, the image light 375 is surrounded by the structured IR light 395 on the left side. In other embodiments, the image light 375 is surrounded by the structured IR light 395 on the right side or both sides.

Figure 4C:
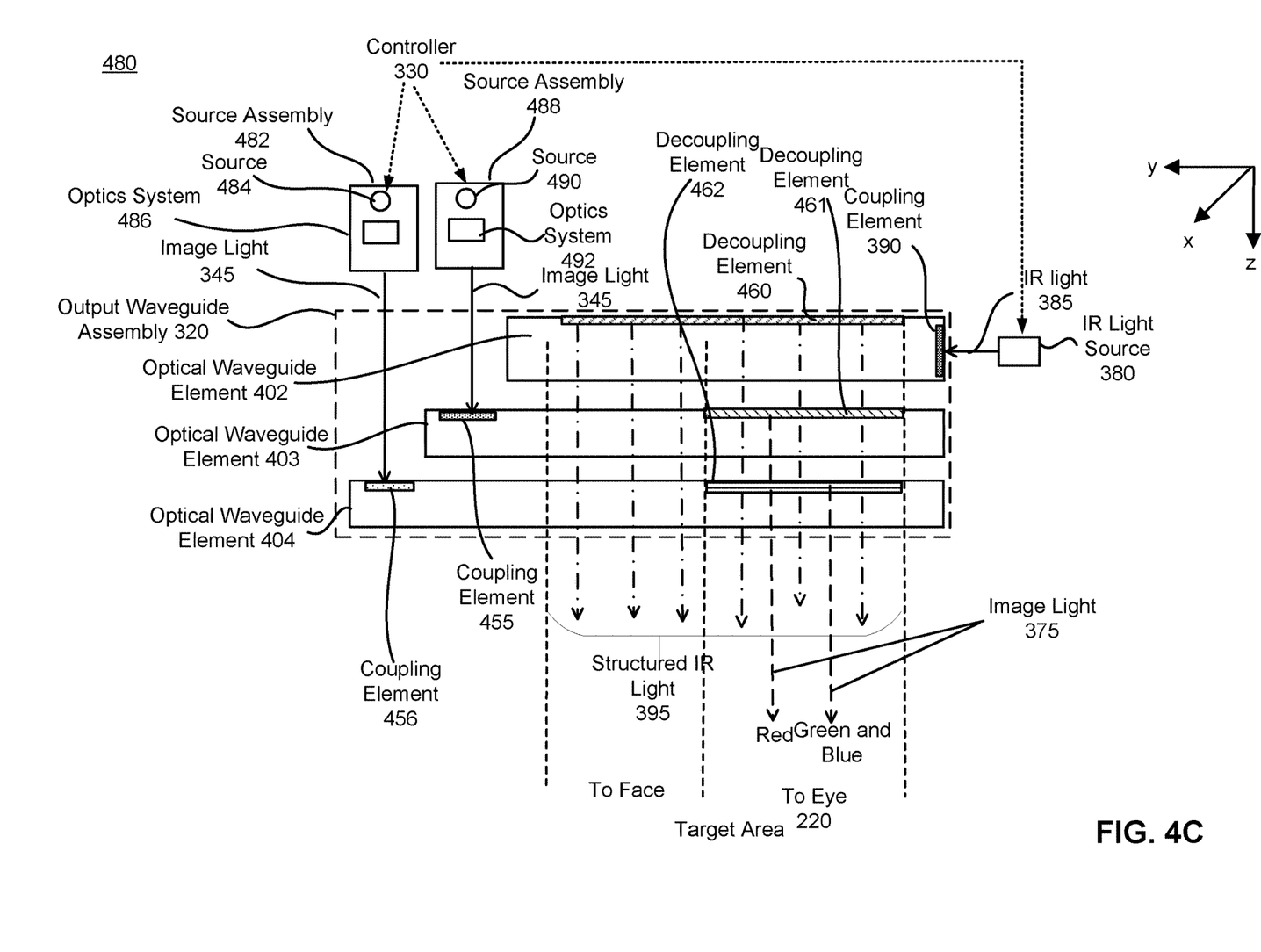
FIG. 4C illustrates a cross section of a waveguide display, in accordance with one or more embodiments.

FIG. 4C illustrates a cross section 480 of a waveguide display, in accordance with one or more embodiments. One example waveguide display with the illustrated cross section 400 is shown in FIG. 3. As described previously, the waveguide display 300 includes the source assembly 310 and the output waveguide assembly 320. The source assemblies 482 and 488 are embodiments of the source assembly 310 of FIG. 3. The source assembly 482 includes a source 484 and an optics system 486. The source assembly 488 includes a source 490 and an optics system 492. The sources 482, 484 are embodiments of the source 340 of FIG. 3. The optics systems 486, 492 are embodiments of the optics system 350 of FIG. 3. The output waveguide assembly 320 includes optical waveguide elements 402, 403, 404, coupling elements 455-456, the coupling element 390, and decoupling elements 460, 461, 462. The coupling elements 455-456 are an embodiment of the coupling element 390 of FIG. 3. The decoupling elements 460, 461, 462 are an embodiment of the decoupling element 360 of FIG. 3.

Compared to the source assembly 310 illustrated in FIG. 4A, the source assembly 482 emits image light at a wavelength corresponding to first and second color (e.g., blue, green), and the source assembly 488 emits image light at a wavelength corresponding to a third color (e.g., red). The source assemblies 482, 488 generate light in accordance with instructions from the controller 330. The sources 484, 490 are similar to the source 440 described in connection with FIG. 4A and the optics systems 486, 492 are similar to the optics system 450 described in connection with FIG. 4A, description of which is omitted herein for the sake of brevity.

Description of the IR light source 380 has been provided previously in connection with FIGS. 3-4A and is omitted herein for the sake of brevity.

Compared to the embodiment illustrated in FIG. 4A, the output waveguide assembly 320, the optical waveguide elements 402, 403, 404 are not stacked. In addition, the coupling elements 455, 456 are positioned separate from each other. Description of the optical waveguide elements 402, 403, 404, coupling elements 455, 456, decoupling elements 460, 461, 462 has been provided previously in connection with FIG. 4A and is omitted herein for the sake of brevity.

Figure 5:
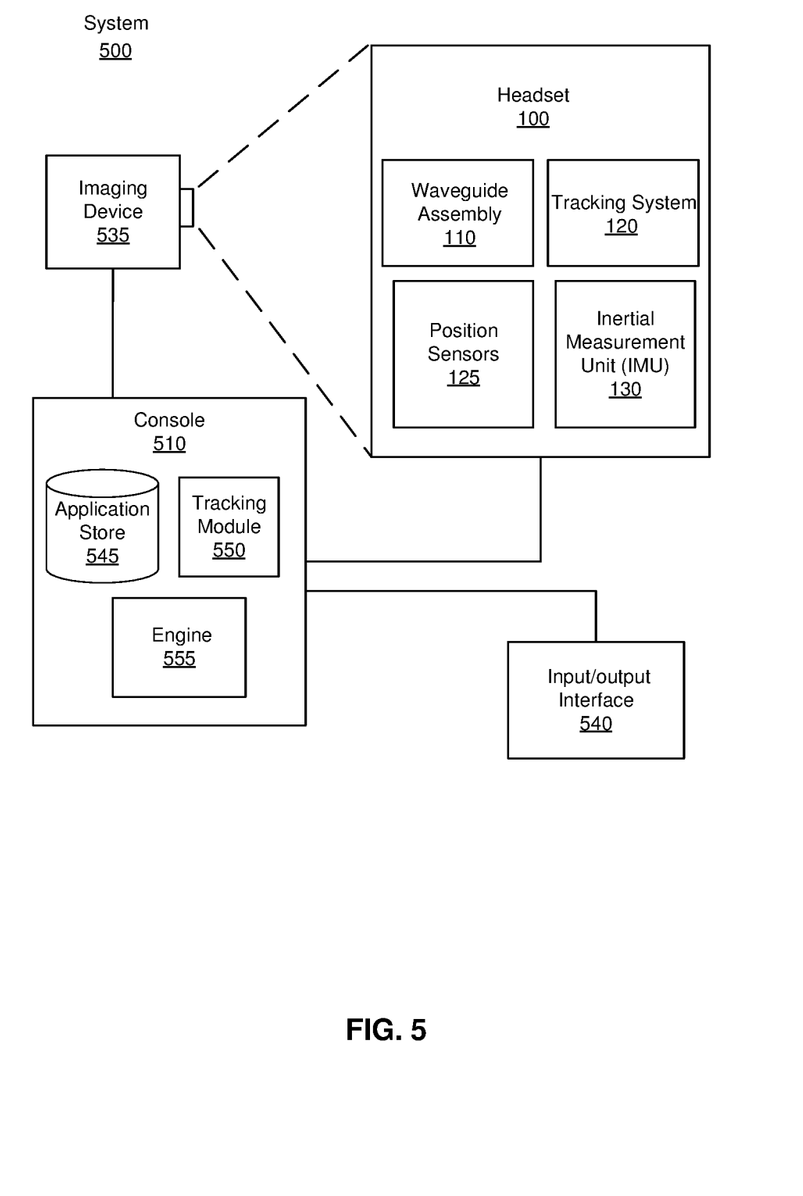
FIG. 5 is a block diagram of a system including a headset, in accordance with one or more embodiments.

FIG. 5 is a block diagram of a system 500 including a headset 505, according to an embodiment. The system 500 shown by FIG. 5 comprises the headset 505, an imaging device 535, and an input/output interface 540 that are each coupled to the console 510. While FIG. 5 shows an example system 500 including one headset 505, one imaging device 535, and one input/output interface 540, in other embodiments, any number of these components may be included in the system 500. For example, there may be multiple headsets 100 each having an associated input/output interface 540 and being monitored by one or more imaging devices 535, with each headset 505, imaging devices 535, and the input/output interface 540, communicating with the console 510. In alternative configurations, different and/or additional components may be included in the system 500. Similarly, functionality of one or more of the components can be distributed among the components in a different manner than is described here. For example, some or all of the functionality of the console 510 may be contained within the headset 505. Additionally, in some embodiments, the system 500 may be modified to include other system environments, such as an AR system environment.

The headset 505 inside the system 500 is an embodiment of the headset 100 of FIG. 1. The headset 505 is a near-eye display that presents media to a user. Examples of media presented by the headset 505 include one or more images, video, audio, or some combination thereof. In some embodiments, audio is presented via an external device (e.g., speakers and/or headphones) that receives audio information from the headset 505, the console 510, or both, and presents audio data based on the audio information. In some embodiments, the headset 505 may also act as an AR eye-wear glass. In these embodiments, the headset 505 augments views of a physical, real-world environment with computer-generated elements (e.g., images, video, sound, etc.)

The waveguide display assembly 210, as illustrated above in conjunction with FIG. 3, is configured to direct an image light to user's eyes wearing the headset 505. The waveguide display assembly 210 may be composed of one or more materials (e.g., plastic, glass, etc.) with one or more refractive indices that effectively minimize the weight. The waveguide display assembly 210 may include a source assembly to generate an image light to present media to user's eyes and an output waveguide with at least one decoupling element that outcouples structured IR light of a pattern. Examples of the output waveguide are described above in conjunction with FIGS. 3-4C.

The tracking system 120 tracks a position and/or movement of a user's eye at one or more eyebox locations of the headset 505. The tracking system 120 also tracks the user's facial expression in a region of the user's face surrounding the user's eye. A camera or other optical sensor inside the headset 505 captures information of user's eyes and/or one or more regions of the user's face, and the tracking system 120 uses the captured information to determine eye tracking information and face tracking information. Examples of eye tracking information and face tracking information are provided in connection with FIG. 2.

The IMU 130 is an electronic device that generates fast calibration data indicating an estimated position of the headset 505 relative to an initial position of the headset 505 based on measurement signals received from one or more of the position sensors 125. A position sensor 125 generates one or more measurement signals in response to motion of the headset 505. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof. In the embodiment shown by FIG. 5, the position sensors 125 are located within the IMU 130, and neither the IMU 130 nor the position sensors 125 are visible to the user (e.g., located beneath an outer surface of the headset 505).

Based on the one or more measurement signals generated by the one or more position sensors 125, the IMU 130 generates fast calibration data indicating an estimated position of the headset 505 relative to an initial position of the headset 505. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the headset 505 from the sampled data. For example, the IMU 130 integrates the measurement signals received from one or more accelerometers over time to estimate a velocity vector and integrates the velocity vector over time to determine an estimated position of a reference point (not shown) on the headset 505. The reference point is a point that may be used to describe the position of the headset 505. While the reference point may generally be defined as a point in space; however, in practice, the reference point is defined as a point within the headset 505 (e.g., the reference point representing a center of the IMU 130).

The imaging device 535 generates slow calibration data in accordance with calibration parameters received from the console 510. The imaging device 535 may include one or more cameras, one or more video cameras, one or more filters (e.g., used to increase signal to noise ratio), or any combination thereof. The imaging device 535 is configured to detect image light emitted or reflected in the FOV of the imaging device 535. In embodiments where the headset 505 include passive elements (e.g., a retroreflector), the imaging device 535 may retro-reflect the image light towards the image light source in the imaging device 535. Slow calibration data is communicated from the imaging device 535 to the console 510, and the imaging device 535 receives one or more calibration parameters from the console 510 to adjust one or more imaging parameters (e.g., focal length, focus, frame rate, ISO, sensor temperature, shutter speed, aperture, etc.).

The input/output interface 540 is a device that allows a user to send action requests to the console 510. An action request is a request to perform a particular action. For example, an action request may be to start or end an application or to perform a particular action within the application. The input/output interface 540 may include one or more input devices. Example input devices include: a keyboard, a mouse, a game controller, or any other suitable device for receiving action requests and communicating the received action requests to the console 510. An action request received by the input/output interface 540 is communicated to the console 510, which performs an action corresponding to the action request. In some embodiments, the input/output interface 540 may provide haptic feedback to the user in accordance with instructions received from the console 510. For example, haptic feedback is provided when an action request is received, or the console 510 communicates instructions to the input/output interface 540 causing the input/output interface 540 to generate haptic feedback when the console 510 performs an action.

The console 510 provides media to the headset 505 for presentation to the user in accordance with information received from one or more of: the imaging device 535, the headset 505, and the input/output interface 540. In the example shown in FIG. 5, the console 510 includes an application store 545, a tracking module 550, and an engine 555. Some embodiments of the console 510 have different modules than those described in conjunction with FIG. 5. Similarly, the functions further described below may be distributed among components of the console 510 in a different manner than is described here.

The application store 545 stores one or more applications for execution by the console 510. An application is a group of instructions, that when executed by a processor, generates content for presentation to the user. Content generated by an application may be in response to inputs received from the user via movement of the headset 505 or the input/output interface 540. Examples of applications include: gaming applications, conferencing applications, video playback application, or other suitable applications.

The tracking module 550 calibrates the system 500 using one or more calibration parameters and may adjust one or more calibration parameters to reduce error in determination of the position of the headset 505. For example, the tracking module 550 adjusts the focus of the imaging device 535 to obtain a more accurate position on the headset 505. Moreover, calibration performed by the tracking module 550 also accounts for information received from the IMU 530. Additionally, if tracking of the headset 505 is lost, the tracking module 550 re-calibrates some or the entire system 500.

The tracking module 550 tracks movements of the headset 505 using slow calibration information from the imaging device 535. The tracking module 550 also determines positions of a reference point of the headset 505 using position information from the fast calibration information. Additionally, in some embodiments, the tracking module 550 may use portions of the fast calibration information, the slow calibration information, or some combination thereof, to predict a future location of the headset 505. The tracking module 550 provides the estimated or predicted future position of the headset 505 to the engine 555.

The engine 555 executes applications within the system 500 and receives position information, acceleration information, velocity information, predicted future positions, or some combination thereof of the headset 505 from the tracking module 550. In some embodiments, the information received by the engine 555 may be used for producing a signal (e.g., switching instructions) to the display assembly 515 that determines the type of content presented to the user. For example, if the received information indicates that the user has looked to the left, the engine 555 generates content for the headset 505 that mirrors the user's movement in a virtual environment by determining the appropriate switching time of the array of liquid crystal gratings of the output waveguide in the display assembly 515. For example, the engine 555 may produce a display instruction that would cause the display assembly 515 to generate content that would move along with the eye position tracked. Additionally, the engine 555 performs an action within an application executing on the console 510 in response to an action request received from the input/output interface 540 and provides feedback to the user that the action was performed. The provided feedback may be visual or audible feedback via the headset 505 or haptic feedback via the input/output interface 540.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
an infrared light (IR) source configured to emit IR light;
an output waveguide assembly comprising:
a first waveguide configured to incouple the IR light, the first waveguide including a decoupling element including a grating that is configured to encode the IR light to form a structured light pattern, the decoupling element configured to outcouple the structured light pattern formed by the grating to illuminate a target area; and
a tracking system configured to determine tracking information based in part on captured structured light pattern, the captured structured light pattern reflected from the target area.

2. The system of claim 1, wherein the grating is a holographic grating.

3. The system of claim 1, wherein the output waveguide further comprises a second waveguide configured to incouple at least a first portion of image light, expand at least the first portion of the image light in at least one dimension, and outcouple at least the first portion of image light toward an eyebox included in the target area.

4. The system of claim 3, wherein the first waveguide and the second waveguide are stacked, and light outcoupled from the second waveguide passes through the first waveguide prior to reaching the target area.

5. The system of claim 3, wherein the first waveguide and the second waveguide are stacked, and light outcoupled from the second waveguide passes through the first waveguide prior to reaching the target area.

6. The system of claim 1, wherein the first waveguide is further configured to incouple a portion of image light, expand the portion of the image light in at least one dimension, and outcouple the portion of the image light toward an eyebox included in the target area.

7. The system of claim 3, wherein the first waveguide is further configured to incouple a second portion of image light, expand the second portion of the image light in at least one dimension, and outcouple the portion of the image light toward an eyebox included in the target area, and wherein the second portion of the image light is in a different optical band than the first portion of the image light.

8. The system of claim 3, wherein the first portion of the image light includes light in a first optical band and in a second optical band that is different than the first optical band.

9. The system of claim 3, wherein the image light includes the first portion of the image light in a first optical band and a second portion of the image light that is in a second optical band, the system further comprising:
a third waveguide configured to incouple the second portion of the image light in the second optical band, expand at least the second portion of the image light in at least one dimension, and outcouple the second portion of image light toward an eyebox.

10. The system of claim 1, wherein the tracking system includes a camera configured to capture the structured light pattern reflected from the target area.

11. The system of claim 3, wherein the eyebox is a region in space occupied by an eye of a user and the tracking information includes eye tracking information for the eye.

12. The system of claim 1, wherein the target area includes a region of a user's face that surrounds the eye, and the tracking information includes face tracking information for the region of the user's face.

13. The system of claim 3, further comprising a light source configured to emit image light.

* * * * *